No. 863,145. PATENTED AUG. 13, 1907.
S. BRAMLEY-MOORE.
CHANGE SPEED GEARING.
APPLICATION FILED JAN. 12, 1907.
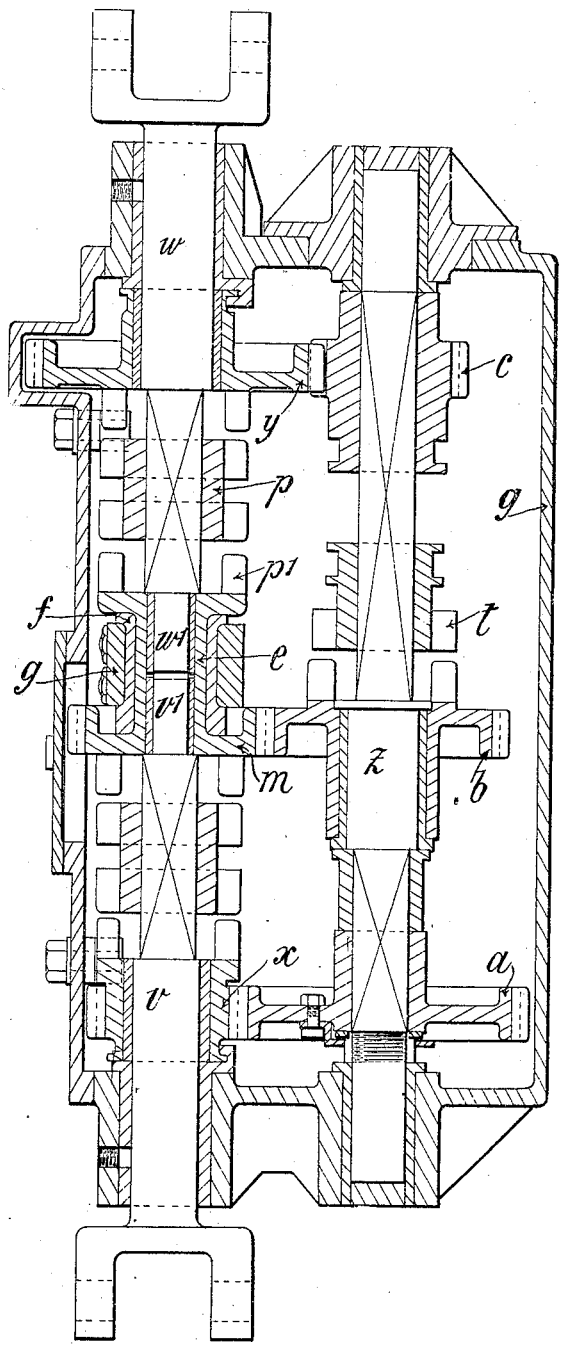
WITNESSES:
G. V. Symes.
Edward L George.
INVENTOR.
S. Bramley-Moore
Per Robert B. Phillips
Attorney.

UNITED STATES PATENT OFFICE.

SWINFEN BRAMLEY-MOORE, OF LONDON, ENGLAND.

CHANGE-SPEED GEARING.

No. 863,145.    Specification of Letters Patent.    Patented Aug. 13, 1907

Application filed January 12, 1907. Serial No. 352,045.

*To all whom it may concern:*

Be it known that I, SWINFEN BRAMLEY-MOORE, a subject of the King of Great Britain and Ireland, residing at 26 Russell Square, Bloomsbury, in the administrative county of London, England, have invented a new and useful Improvement in Change-Speed Gearing, of which the following is a full and complete specification.

This invention relates to improvements in the change speed gearing described in the specification of U. S. A. application for patent, Serial No. 348978, filed 21st December 1906, particularly with reference to Figs. 1, 2, 3 & 4 of the drawings of said specification, and it consists of an improved means for supporting the abutting ends of the driving and driven shafts and of an improved arrangement whereby the countershaft and all the wheels, with the exception of one pair, are quiescent on the direct drive, *i. e.* when the two shafts are coupled directly together.

Referring to the accompanying drawing, which is a view in plan—partly in section—of the improved gear in its neutral position, the driving and driven shafts $v$ and $w$, which are arranged in the same axial line, have their adjacent ends $v^1$ and $w^1$ reduced to fit in a sleeve $e$ which is mounted in a bearing $f$ carried by a part of the box $g$ inclosing the gear. On one end of the sleeve $e$ is formed or fixed a spur wheel $m$. On the driving shaft $v$ is loosely mounted a spur wheel $x$, and on the driven shaft $w$ is a loosely mounted spur wheel $y$. Mounted in suitable bearings parallel with the driving and driven shafts is a countershaft $z$ on which are three spur wheels $a$, $b$ and $c$, the wheel $a$ being fixed on the countershaft and in permanent mesh with the wheel $x$ on the driven shaft, the wheel $b$ being loosely mounted on the countershaft and in permanent mesh with the wheel $m$ on the sleeve $e$, and the wheel $c$ being so mounted that it rotates with said shaft but is free to slide thereon to bring it in and out of mesh with the wheel $y$ on the driven shaft. On the driven shaft $w$ is a sliding claw clutch $p$ adapted to couple either the wheel $y$ or the sleeve $e$ through the claws $p^1$ carried by said sleeve to the said shaft $w$, and on the driving shaft $v$ is a similar sliding claw clutch adapted to couple either the wheel $x$ or the sleeve $e$ to the said shaft $v$. The wheel $b$ on the countershaft $z$ is capable of being coupled to said shaft by a sliding claw clutch $t$ when the said wheel is used to transmit either the motion of the driving shaft $v$ to the countershaft $z$, or the motion of the countershaft $z$ to the driven shaft $w$, but at other times it is loose on said countershaft, so that on the direct drive, *i. e.* when the motion of the driving shaft $v$ is transmitted direct to the driven shaft $w$ through the sleeve $e$, the wheel $b$ runs idly on the countershaft so that said shaft and the other wheels $a$ $c$ $x$ and $y$ remain quiescent.

What I claim as my invention, and desire to secure by Letters Patent is:—

1. A change speed gear comprising a driving and a driven shaft in axial alinement, a sleeve encircling and supporting the adjacent ends of said shafts, a bearing for supporting said sleeve, a countershaft mounted parallel with said driving and driven shafts, a spur wheel on one end of said sleeve, a spur wheel mounted loosely on the driving shaft, a spur wheel mounted loosely on the driven shaft, a spur wheel fixed on the countershaft and in constant mesh with the spur wheel mounted on the driving shaft, a spur wheel so mounted on the countershaft that it is constrained to rotate therewith but is free to slide thereon so that it can be brought into mesh with the spur wheel on the driven shaft, a spur wheel mounted loosely on the countershaft and in constant mesh with the spur wheel on the sleeve, means for coupling the loosely mounted spur wheel on the countershaft to said shaft, and means for coupling the spur wheels on the driving and driven shafts to their respective shafts and the spur wheel on the sleeve to either or both of said shafts, as set forth.

2. In a change speed gear the combination of a driving shaft $v$ and a driven shaft $w$ in axial alinement, a countershaft $z$ mounted parallel with said shafts a sleeve $e$ mounted on the adjacent ends of the driving and driven shafts, a bearing $f$ for said sleeve, a spur wheel $x$ mounted loosely on the driving shaft, a spur wheel $y$ mounted loosely on the driven shaft, a spur wheel $m$ on one end of the sleeve $e$, a spur wheel $a$ fixed on the countershaft and in constant mesh with the spur wheel $x$ on the driving shaft, a spur wheel $c$ mounted so as to rotate with but free to slide on the countershaft so that it can be brought in and out of gear with the spur wheel $y$ on the driven shaft, a spur wheel $b$ mounted loosely on the countershaft and in constant mesh with the spur wheel $m$, means for coupling the spur wheel $b$ to the countershaft, and means for coupling the spur wheels $x$ and $y$ to their respective shafts and the sleeve $e$ to either or both of said shafts, as set forth.

In testimony whereof I have signed my name in the presence of two subscribing witnesses.

SWINFEN BRAMLEY-MOORE.

Witnesses:
ROBERT F. PHILLIPS,
H. D. JAMESON.